United States Patent [19]

Schmidt

[11] Patent Number: 4,793,211
[45] Date of Patent: Dec. 27, 1988

[54] VEHICLE DIFFERENTIAL AXLE BEARING ARRANGEMENT

[75] Inventor: Johannes Schmidt, Esslingen, Fed. Rep. of Germany

[73] Assignee: Daimler-Benz Aktiengesellschaft, Stuttgart, Fed. Rep. of Germany

[21] Appl. No.: 128,181

[22] Filed: Dec. 3, 1987

[30] Foreign Application Priority Data

Dec. 16, 1986 [DE] Fed. Rep. of Germany ....... 3642875

[51] Int. Cl.$^4$ ............................................. F16H 1/40
[52] U.S. Cl. ................................. 74/713; 74/DIG. 7
[58] Field of Search .................. 74/711, 710.5, 710, 74/713, DIG. 7; 384/912

[56] References Cited

U.S. PATENT DOCUMENTS

| | | |
|---|---|---|
| 2,563,680 | 8/1951 | Hoffman ............................ 74/607 |
| 3,138,970 | 6/1964 | Costa et al. ....................... 74/711 |
| 3,202,466 | 8/1965 | Kaptur ............................... 74/713 |
| 3,470,768 | 10/1969 | Ford et al. ........................ 74/713 |
| 3,769,533 | 10/1973 | Pauwels ............................ 74/711 |
| 3,949,841 | 4/1976 | Jovick et al. ..................... 74/710.5 |
| 4,086,826 | 5/1978 | von Kaler ......................... 74/713 |
| 4,583,424 | 4/1986 | von Hiddessen et al. ........ 74/710.5 |
| 4,683,775 | 8/1987 | Hilker ............................... 74/710 |
| 4,733,578 | 3/1988 | Glaze et al. ...................... 74/713 |

FOREIGN PATENT DOCUMENTS 1630902 6/1975 Fed. Rep. of Germany .
2508948 9/1975 Fed. Rep. of Germany .

Primary Examiner—Allan D. Herrmann
Assistant Examiner—Rabinderpal Singh Mangat
Attorney, Agent, or Firm—Barnes & Thornburg

[57] ABSTRACT

In a bearing arrangement of a differential casing of a differential transmission in an axle transmission light metal casing of a motor vehicle, a bearing intermediate sleeve is inserted in a bearing eye of the axle transmission casing so that it cannot move. An axle journal of the differential casing is supported by a conical roller bearing on the bearing intermediate sleeve and one shaft end of a driven shaft of the differential gear is supported by a shaft bearing in the bearing intermediate sleeve. In order to achieve a compact and light structure despite high bearing forces, provision is made for the axle transmission casing to consist of aluminum and to be formed integrally with the bearing eye. The bearing intermediate sleeve also consists of aluminum and a rolling contact bearing is used for the associated shaft bearing.

13 Claims, 1 Drawing Sheet

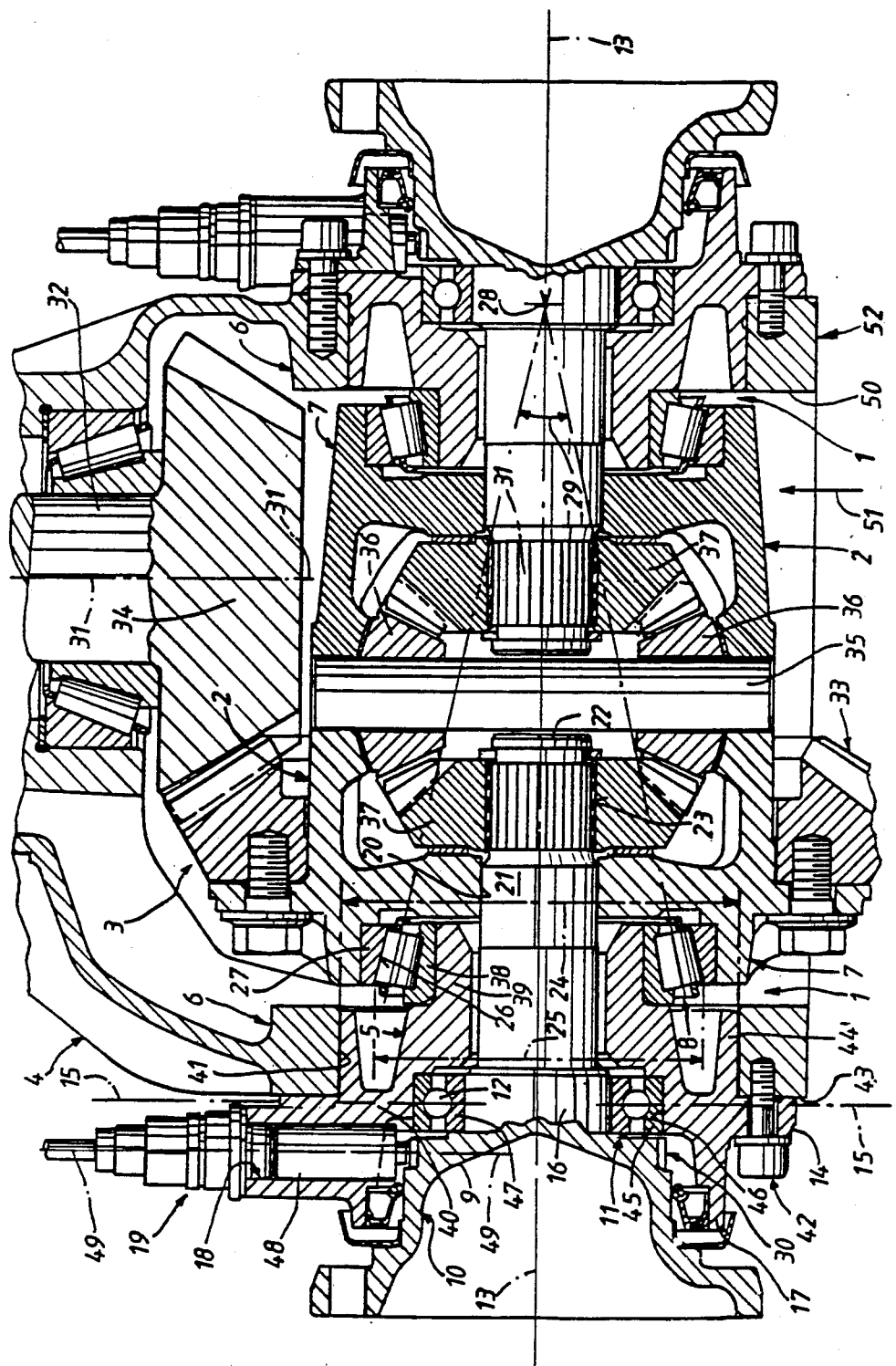

VEHICLE DIFFERENTIAL AXLE BEARING ARRANGEMENT

BACKGROUND AND SUMMARY OF INVENTION

The invention refers to a bearing arrangement for a differential casing of a differential transmission in an axle transmission light metal casing of a motor vehicle.

In a known bearing arrangement of this type described in German published Application (DE-AS) No. 1,630,902, a long slender axle journal of the differential casing located eccentrically to the two conical roller bearings, with respect to the plane of rotation of the axes of the differential bevel pinions, carries at its outer end the inner race of a conical roller bearing whose outer race is seated in the bearing intermediate sleeve. Because of the long distance between bearings and the small average race diameter of this eccentrically located conical roller bearing, this known bearing arrangement is only suitable for low bearing forces from relatively low-powered motor vehicles. In the known bearing arrangement, the sliding bearing of the driven shaft is located axially in the same diametral plane as the conical roller bearing so that a tubular shaft section departs axially outwards from the shaft section of the driven shaft with sliding bearing support, this tubular shaft section then requiring a further bearing, so that this known bearing arrangement is not directly suitable for swing axles.

In a known bearing arrangement of another type for a commercial vehicle (U.S. Pat. No. 2,563,680), a drive axle is provided with a rigid axle casing of the banjo type in which two side axle tubes depart rigidly from a central flat ring casing body. In order to support the differential casing, which generally also includes the ring gear for engagement with the drive pinion of the cardan shaft, and the two driven shafts, a casing insert inserted in the annular casing body and having two separate bearing eyes is used for the axle journals of the differential casing. Despite the general use of pressed sheet metal parts, this known rigid axle is quite heavy in construction. Neither can this rigid axle be converted without difficulty as a swing axle in the manner usual for passenger cars. One of the reasons why this is not possible is that the inner end of each axle tube is welded to the two sheet metal walls of the double-walled-ring casing body to make a rigid composite. The inner end of each driven half-shaft, on the other hand, has only one single defined bearing position, i.e. a sliding support in the bearing intermediate sleeve in the region of that diametral plane in which is also located the average race diameter of the conical roller bearing which is seated with its inner race on the bearing intermediate sleeve.

In a known bearing arrangement of a different generic type (U.S. Pat. No. 3,202,466) of a steel differential casing of a differential transmission in an aluminum axle transmission casing of a motor vehicle, the axle journals of the differential casing are directly supported in the single-piece bearing eyes by means of conical roller bearings. In a radial reference plane located approximately centrally to the conical roller bearing, the driven shaft has direct sliding support in the axle journal so that a increase in the conical roller bearing so as to accept larger bearing loads is not immediately possible.

An objective on which the invention is based consists essentially in producing a light and compact bearing arrangement of a differential casing of a differential transmission in an axle transmission casing of a motor vehicle for the acceptance of higher bearing loads.

This objective is achieved according to the invention by providing a bearing arrangement of a differential casing of a differential transmission in an axle transmission light-metal casing of a motor vehicle, in which a bearing intermediate sleeve, also in light metal, is inserted so that it cannot move in a bearing eye formed integrally with the axle transmission casing, in which an axle journal of the differential casing is supported by a conical roller bearing, in turn supported on the bearing intermediate sleeve and in which a driven shaft has sliding bearing support by means of a shaft section in a corresponding shaft passage of the differential casing, wherein the inner race of the conical roller bearing is seated on the bearing intermediate sleeve and the drive shaft is additionally supported in the bearing intermediate sleeve by a rolling contact bearing located offset relative to the conical roller bearing in the direction of the bearing axis pointing away from the differential casing.

An advantageous feature in the bearing arrangement according to the invention is that the dimensions of the conical roller bearing are substantially independent of the dimensions of the shaft bearing of the bearing intermediate sleeve and that, because of use of a rolling contract bearing for the steel drive shaft, the bearing intermediate sleeve and also the axle transmission casing can be manufactured from aluminum without troublesome thermal expansions appearing in the bearing arrangement.

In certain preferred embodiments, the roller contract bearing of the driven shaft and a radial fastening flange of the bearing intermediate sleeve are at least approximately located in one radial reference plane of the bearing intermediate sleeve. With this arrangement, the distance between the bearings in the bearing arrangement is advantageously increased for the two support positions of the driven shaft without widening the bearing arrangement overall.

In certain preferred embodiments, the bearing intermediate sleeve has a radial acceptance hole for accommodating parts of a rotational speed sensor, which hole is disposed on the sleeve end opposite the conical roller bearing. This feature makes it possible to use an axle transmission case of the same design for motor vehicles with and without rotational speed sensors on the driven wheels.

In especially preferred embodiments the acceptance hole as the conical roller bearing are located on opposite sides of a radial reference plane through the shaft bearing. With this arrangement, the axial distance between the axle transmission casing and the differential casing is kept as small as possible in each of the directions of the bearing axis.

Finally, the in the case of tandem axles (German Published Unexamined Application - DE-OS No. 2,508,948), it is also known to support the axle journal of the differential casing and the drive half-shaft penetrating the latter by one conical roller bearing each, directly in the single-piece bearing eye of the axle casing, avoiding the use of a bearing intermediate sleeve, the axle casing then having to be split in order to fit the axially inner and larger of the two conical roller bearings.

By means of certain preferred embodiments of the bearing arrangement of the invention the driven shaft has a cylindrical bearing section of a corresponding shaft passage of the differential casing and has splines on its other shaft end continuing axially from the cylindrical bearing section in the differential casing. The bearing section preferably slides directly in the shaft passage. Thus, the shaft bearing of the driven shaft in the differential casing is separated in an advantageous manner from the connection between the driven shaft and the driven shaft bevel gear wheel. By this means, this bearing arrangement is improved and the design of the driven shaft bevel wheel is simplified relative to an arrangement in which the driven shaft is supported indirectly by means of an extended hub of the driven shaft bevel wheel in the shaft passage of the differential casing.

In certain preferred embodiments, the clear width of the bearing eye is at least equal to the maximum diameter of the running surface of the outer ring of the conical roller bearing. This assures that simple assembly of the conical roller bearing is made possible with the smallest possible distance apart of the bearing eyes.

In certain preferred embodiments the apex of the conical angle of the conical roller bearing is located displaced relative to the conical roller bearing in the direction of the differential casing. An O-type bearing arrangement is then provided in advantageous manner.

In certain preferred embodiments the driven shaft has a toothed ring which continues axially from the bearing section of the driven shaft for the shaft bearing associated with the bearing intermediate sleeve. The measuring accuracy of the rotational speed sensor is thus advantageously increased.

Other objects, advantages and novel features of the present invention will become apparent from the following detailed description of the invention when considered in conjunction with the accompanying drawings.

BRIEF DESCRIPTION OF THE DRAWINGS

The single drawing figure is a partial schematic sectional view of an axle transmission of a motor vehicle, constructed in accordance with a preferred embodiment of the invention.

DETAILED DESCRIPTION OF THE DRAWING

The drawing shows a section in a plane through an axle transmission of a motor vehicle containing the bearing axis 13—13 of the bearing arrangement 1 according to the invention and located parallel to a longitudinal axis 31—31 of a pinion shaft 32.

An axle transmission casing 4 has two bearing eyes 6 aligned with the bearing axis 13—13, in each of which bearing eyes an axle journal 7 of a differential casing 2 of a differential transmission 3 is supported by one of two bearing arrangements 1 in accordance with the invention.

The two bearing arrangements 1 are mirror images and therefore have the same design so that in what follows, reference is only made to the left-hand bearing arrangement 1 in the drawing.

The differential casing 2 is provided with a conventional ring gear 33 which engages with a pinion 34 integral with the pinion shaft 32.

A cross pin 35, on which differential bevel opinions 36 are rotably supported, is held within the differential casing 2; the differential bevel pinions 36 engage with two driven bevel wheels 37, each of which is connected rotationally solidly, by means of corresponding splines 23, to the shaft end 22 within the casing of a driven shaft 10. A sliding bearing section 21 of the driven shaft 10 and following on from the relevant splines 23 is directly supported in a shaft passage 20 of the differential casing 2. The outer ring 27 of a conical roller bearing 8 is inserted in the axial journal 7 externally concentric to the shaft passage 20 in such a way that the apex 28 of the cone angle 29 is located displaced relative to the conical roller bearing 8 in the direction of the bearing axis 13—13 pointing towards the differential casing 2—which provides an O-type bearing arrangement for the differential casing 2.

The inner race 38 of the conical roller bearing 8 is seated on an end surface bearing seating 39 of a bearing intermediate sleeve 5 formed integrally with a bearing end plate 40, which latter is provided with a bearing seating 44 inserted in the bearing opening 41 of the adjacent bearing eye 6. The bearing end plate 40 merges into a radial fastening flange 14 which is fastened to the outer end surface 43 of the bearing eye 6 by means of fastening bolts 42.

A second shaft bearing 11 in the form of a single-row ball-bearing 12 is provided for the driven shaft 10 in a radial reference plane 15—15 of the bearing intermediate sleeve 5 and located in the region of the bearing end plate 40; the outer race 45 of this second shaft bearing 11 is inserted in a cylindrical bearing seating 46 of the bearing intermediate sleeve 5 while the associated inner race 47 is seated on a cylindrical bearing section 16 of the outer shaft end 9 of the driven shaft 10.

The bearing intermediate sleeve 5 has an acceptance hole 18 between its outer sleeve end 17 and the fastening flange 14 for the casing 48 of a rotational speed sensor 19 which is located with its hole axis 49—49 radial to the bearing axis 13—13 and central to a toothed ring 30, which is centrally located or formed on a shaft section of the driven shaft 10 directly following from the bearing section 16 and acts as the shaft marking for the rotational speed sensor 19.

At its casing end located opposite to the pinion shaft 32, the axle transmission casing 4 has a final casing wall 52 extending parallel to the bearing axis 13—13 and having an assembly opening 50, by means of which the differential casing with the preassembled ring gear 33 and preassemble outer races 27 are inserted into the axle transmission casing 4 in the arrow direction 51.

The diameter 24 of the bearing opening 41—i.e. the clear width of the bearing eye 6—is greater than the maximum diameter 25 of the running surface 26 of the outer ace 27. By this means, the inner race 38 together with the cage holding the rollers can be preassembled on the bearing seating 39 so that this preassembled unit can be introduced from outside via the bearing opening 41 into the axle transmission casing 4 and can be brought into position with the rollers in contact with the outer race 27.

By means of the use of the ball-bearing 12 as the shaft bearing, different thermal expansions of the steel drive shaft 10, on the one hand, and the aluminum bearing intermediate sleeve 5, on the other, can be kept within tolerable limits or compensation can be provided by means of bearing clearance, etc. Compensation is provided in the conical roller bearing 8 for larger radial thermal expansions of the aluminum bearing seating 39 relative to the axle journal 7, due to axial thermal expansions of the axle transmission casing 4 (als aluminum) in the directions of the bearing axis 13—13.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Bearing arrangement of a differential casing of a differential transmission in an axle transmission light-metal casing of a motor vehicle, in which a bearing intermediate sleeve, also in light metal, is inserted so that it cannot move in a bearing eye formed integrally with the axle transmission casing, in which an axle journal of the differential casing is supported by a conical roller bearing, in turn supported on the bearing intermediate sleeve and in which a driven shaft has sliding bearing support by means of a shaft section in a corresponding shaft passage of the differential casing, wherein the inner race of the conical roller bearing is seated on the bearing intermediate sleeve and the driven shaft is additionally supported in the bearing intermediate sleeve by a rolling contact bearing located offset relative to the conical roller bearing in the direction of the bearing axis pointing away from the differential casing.

2. Bearing arrangement according to claim 1, wherein the rolling contact bearing of the driven shaft and a radial fastening flange of the bearing intermediate sleeve are at least approximately located in one radial reference plane of the bearing intermediate sleeve.

3. Bearing arrangement according to claim 1, wherein the bearing intermediate sleeve has a radial acceptance hole on its sleeve end opposite to the conical roller bearing for accommodating parts of a rotational speed measuring device.

4. Bearing arrangement according to claim 2, wherein the bearing intermediate sleeve has a radial acceptance hole on its sleeve end opposite to the conical roller bearing for accommodating parts of a rotational speed measuring device.

5. Bearing arrangement according to claim 4, wherein the acceptance hole and the conical roller bearing are located on different sides of the reference plane.

6. Bearing arrangement according to claim 1, wherein the driven shaft has splines on its inner shaft end located in the differential casing, and wherein the splines continue directly from the shaft section with sliding bearing support in the differential casing.

7. Bearing arrangement according to claim 1, wherein the clear width of the bearing eye is at least equal to the maximum diameter of the running surface of the outer ring of the conical roller bearing.

8. Bearing arrangement according to claim 1, wherein the apex of the conical angle of the conical roller bearing is located offset relative to the conical roller bearing in the direction of the differential casing.

9. Bearing arrangement according to claim 1, wherein the driven shaft has a toothed ring which continues axially from the rolling contract bearing.

10. Bearing arrangement according to claim 5, wherein the driven shaft has splines on its inner shaft end located in the differential casing, and wherein the splines continue directly from the shaft section with sliding bearing support in the differential casing.

11. Bearing arrangement according to claim 10, wherein the clear width of the bearing eye is at least equal to the maximum diameter of the running surface of the outer ring of the conical roller bearing.

12. Bearing arrangement according to claim 5, wherein the clear width of the bearing eye is at least equal to the maximum diameter of the running surface of the outer ring of the conical roller bearing.

13. Bearing arrangement according to claim 6, wherein the clear width of the bearing eye is at least equal to the maximum diameter of the running surface of the outer ring of the conical roller bearing.

* * * * *